United States Patent
Kim et al.

(10) Patent No.: US 9,720,506 B2
(45) Date of Patent: Aug. 1, 2017

(54) 3D SILHOUETTE SENSING SYSTEM

(71) Applicant: Microsoft Technology Licensing, LLC, Redmond, WA (US)

(72) Inventors: David Kim, Cambridge (GB); Shahram Izadi, Cambridge (GB); Vivek Pradeep, Snohomish, WA (US); Steven Bathiche, Kirkland, WA (US); Timothy Andrew Large, Bellevue, WA (US); Karlton David Powell, Lake Stevens, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/154,571

(22) Filed: Jan. 14, 2014

(65) Prior Publication Data

US 2015/0199018 A1    Jul. 16, 2015

(51) Int. Cl.
  *G06F 3/01* (2006.01)
  *G01B 11/24* (2006.01)
  (Continued)

(52) U.S. Cl.
  CPC .............. *G06F 3/017* (2013.01); *G01B 11/24* (2013.01); *G06F 3/0325* (2013.01);
  (Continued)

(58) Field of Classification Search
  CPC ........ G06F 3/042; G06F 3/0425; G06F 3/017; G06F 3/0416–3/0418; G06F 3/0412; G03B 17/54; G03B 31/134
  See application file for complete search history.

(56) References Cited

U.S. PATENT DOCUMENTS 6,163,336 A * 12/2000 Richards ............ G02B 27/0093
                                                                      348/42
6,545,670 B1 * 4/2003 Pryor .................... G06F 3/0425
                                                                      345/156

(Continued)

FOREIGN PATENT DOCUMENTS

EP      2568355 A2    3/2013
GB      2461804 A *   1/2010

OTHER PUBLICATIONS

Agarwal, et al., "High Precision Multi-touch Sensing on Surfaces using Overhead Cameras", In Proceedings of IEEE International Workshop on Horizontal Interactive Human-Computer Systems, Oct. 10, 2007, 4 pages.

(Continued)

*Primary Examiner* — Patrick F Marinelli

(57) ABSTRACT

A 3D silhouette sensing system is described which comprises a stereo camera and a light source. In an embodiment, a 3D sensing module triggers the capture of pairs of images by the stereo camera at the same time that the light source illuminates the scene. A series of pairs of images may be captured at a predefined frame rate. Each pair of images is then analyzed to track both a retroreflector in the scene, which can be moved relative to the stereo camera, and an object which is between the retroreflector and the stereo camera and therefore partially occludes the retroreflector. In processing the image pairs, silhouettes are extracted for each of the retroreflector and the object and these are used to generate a 3D contour for each of the retroreflector and object.

20 Claims, 13 Drawing Sheets

(51) Int. Cl.

| | | |
|---|---|---|
| *G06K 9/00* | (2006.01) | |
| *H04N 13/02* | (2006.01) | |
| *H04N 5/33* | (2006.01) | |
| *G06K 9/52* | (2006.01) | |
| *G06F 3/042* | (2006.01) | |
| *G06F 3/041* | (2006.01) | |
| *G06F 3/03* | (2006.01) | |
| *G06K 9/20* | (2006.01) | |
| *G06K 9/46* | (2006.01) | |

(52) U.S. Cl.
CPC .......... *G06F 3/0416* (2013.01); *G06F 3/0421* (2013.01); *G06F 3/0425* (2013.01); *G06K 9/00355* (2013.01); *G06K 9/00362* (2013.01); *G06K 9/2036* (2013.01); *G06K 9/4604* (2013.01); *G06K 9/52* (2013.01); *H04N 5/33* (2013.01); *H04N 13/0203* (2013.01)

(56) References Cited

U.S. PATENT DOCUMENTS

| | | | | |
|---|---|---|---|---|
| 6,618,497 | B1* | 9/2003 | Nakayama | G01C 11/06 382/154 |
| 8,139,110 | B2 | 3/2012 | Nishihara | |
| 8,234,578 | B2* | 7/2012 | Ferren | G06F 3/017 345/156 |
| 8,589,824 | B2* | 11/2013 | Hillis | G06F 3/017 382/103 |
| 8,902,195 | B2* | 12/2014 | McGibney | G06F 3/0386 250/224 |
| 8,970,489 | B2* | 3/2015 | Smoot | G06K 9/00335 345/156 |
| 8,972,902 | B2* | 3/2015 | Nishihara | G06F 3/017 345/156 |
| 2001/0050669 | A1* | 12/2001 | Ogawa | G06F 3/0425 345/156 |
| 2002/0089412 | A1* | 7/2002 | Heger | G06F 3/017 340/5.82 |
| 2003/0063300 | A1* | 4/2003 | Rubinstenn | A45D 44/005 358/1.9 |
| 2003/0071810 | A1* | 4/2003 | Shoov | G06F 17/50 345/420 |
| 2003/0214485 | A1* | 11/2003 | Roberts | G06F 3/0418 345/173 |
| 2004/0212886 | A1* | 10/2004 | Hubbs | G02B 5/122 359/515 |
| 2005/0151850 | A1* | 7/2005 | Ahn | G06F 3/017 348/207.99 |
| 2008/0013826 | A1* | 1/2008 | Hillis | G06K 9/00355 382/154 |
| 2008/0028325 | A1* | 1/2008 | Ferren | G06F 3/017 715/753 |
| 2009/0027337 | A1* | 1/2009 | Hildreth | G06F 3/011 345/158 |
| 2009/0103780 | A1* | 4/2009 | Nishihara | G06F 3/017 382/103 |
| 2009/0116742 | A1* | 5/2009 | Nishihara | G06F 3/0425 382/173 |
| 2009/0139778 | A1* | 6/2009 | Butler | G06F 1/1626 178/18.03 |
| 2009/0219253 | A1* | 9/2009 | Izadi | G06F 3/0421 345/173 |
| 2010/0050133 | A1* | 2/2010 | Nishihara | G06F 3/017 715/863 |
| 2010/0194976 | A1* | 8/2010 | Smith | G06F 3/0425 348/373 |
| 2010/0281440 | A1 | 11/2010 | Underkoffler et al. | |
| 2010/0315413 | A1* | 12/2010 | Izadi | G06F 3/017 345/419 |
| 2011/0025925 | A1* | 2/2011 | Hansen | G06F 3/0304 348/734 |
| 2011/0050650 | A1* | 3/2011 | McGibney | G06F 3/0386 345/175 |
| 2012/0076353 | A1* | 3/2012 | Large | G03B 17/54 382/103 |
| 2012/0113140 | A1 | 5/2012 | Hilliges et al. | |
| 2012/0200535 | A1* | 8/2012 | Stienstra | G06F 3/0421 345/175 |
| 2013/0100256 | A1* | 4/2013 | Kirk | G06T 7/0057 348/48 |
| 2013/0103446 | A1* | 4/2013 | Bragdon | G06Q 10/1095 705/7.15 |
| 2013/0169527 | A1 | 7/2013 | Pryor | |
| 2014/0003651 | A1* | 1/2014 | Smoot | G06K 9/00335 382/103 |
| 2014/0168064 | A1* | 6/2014 | Kim | G06F 3/0304 345/156 |
| 2014/0292651 | A1* | 10/2014 | Smoot | G06K 9/00335 345/156 |
| 2014/0307047 | A1* | 10/2014 | Kirk | H04N 5/33 348/42 |
| 2014/0307058 | A1* | 10/2014 | Kirk | H04N 5/33 348/47 |
| 2015/0111646 | A1* | 4/2015 | Smoot | G06K 9/00335 463/36 |
| 2015/0146939 | A1* | 5/2015 | Datta | A01K 67/00 382/110 |
| 2015/0199018 | A1* | 7/2015 | Kim | G06F 3/017 345/156 |

OTHER PUBLICATIONS

Coldefy, et al., "Digitable: An Interactive Multiuser Table for Collocated and Remote Collaboration Enabling Remote Gesture Visualization", in IEEE Conference on Computer Vision and Pattern Recognition, Jun. 17, 2007, 8 pages.

Izadi, et al., "C-Slate: A Multi-Touch and Object Recognition System for Remote Collaboration using Horizontal Surfaces", In Proceedings of the Second Annual IEEE International Workshop on Horizontal Interactive Human-Computer Systems (Tabletop), Oct. 2007, 8 pages.

"Computer stereo vision—wikipedia, the free encyclopedia", Published on: Mar. 19, 2015 Available at: http://en.wikipedia.org/wiki/Computer_stereo_vision.

"Detecting a Visual Target", Published on: Jan. 2013 Available at: http://www.roborealm.com/FRC2e13/slidee10.php.

"Kinect—Wikipedia, the free encyclopedia", Published on: Mar. 19, 2015 Available at: http://en.wikipedia.org/wiki/Kinect.

Kijima, et al., "Distributed display approach using PHMD with infrared camera", In Proceedings of IEEE Virtual Reality, Mar. 24, 2002, 8 Pages.

"International Search Report and Written Opinion Issued in PCT Patent Application No. PCT/US2014/072621", Mailed Date: Apr. 9, 2015, 13 Pages.

Agarwal, A., Izadi, S., Chandraker, M., and Blake, A. High precision multi-touch sensing on surfaces using overhead cameras. In Horizontal Interactive Human-Computer Systems, 2007. TABLETOP'07. Second Annual IEEE International Workshop on, IEEE (2007), 197-200.

Izadi, S., Agarwal, A., Criminisi, A., Winn, J., Blake, A., and Fitzgibbon, A. C-slate: a multi-touch and object recognition system for remote collaboration using horizontal surfaces. In Horizontal Interactive Human-Computer Systems, 2007. TABLETOP'07. Second Annual IEEE International Workshop on, IEEE (2007), 3-10.

Malik, S., and Laszlo, J. Visual touchpad: a two-handed gestural input device. In Proceedings of the 6th international conference on Multimodal interfaces, ACM (2004), 289-296.

Itai Katz, Kevin Gabayan, and Hamid Aghajan. 2007. A multi-touch surface using multiple cameras. In Proceedings of the 9th international conference on Advanced concepts for intelligent vision systems (ACIVIS'07), Jacques Blanc-Talon, Wilfried Philips, Dan Popescu, and Paul Scheunders (Eds.). Springer-Verlag, Berlin, Heidelberg, 97-108.

(56) References Cited

OTHER PUBLICATIONS

"Second Written Opinion Issued in PCT Application No. PCT/US2014/072621", dated Nov. 27, 2015, 8 pages.

* cited by examiner

3D SILHOUETTE SENSING SYSTEM

BACKGROUND

There has been significant research over the past decades on Natural User Interfaces (NUI). NUI includes new gesture-based interfaces that use touch and/or touch-less interactions or the full body to enable rich interactions with a computing device. Although many different touch sensors and 3D input devices have been developed, each is typically optimized for a particular input modality (e.g. touch on surfaces, 3D hand gestures or whole body tracking) and has different strengths and limitations. Two commercially available examples are Leap Motion™ and Kinect®. Leap Motion™ is only able to estimate the positions of fingertips of a hand in-air but is able to operate at high precision. Kinect® provides more flexibility in sensing dense depth maps of arbitrary scenes and tracking the human skeleton, but at a lower precision.

The embodiments described below are not limited to implementations which solve any or all of the disadvantages of known 3D sensing systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

A 3D silhouette sensing system is described which comprises a stereo camera and a light source. In an embodiment, a 3D sensing module triggers the capture of pairs of images by the stereo camera at the same time that the light source illuminates the scene. A series of pairs of images may be captured at a predefined frame rate. Each pair of images is then analyzed to track both a retroreflector in the scene, which can be moved relative to the stereo camera, and an object which is between the retroreflector and the stereo camera and therefore partially occludes the retroreflector. In processing the image pairs, silhouettes are extracted for each of the retroreflector and the object and these are used to generate a 3D contour for each of the retroreflector and object.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As described above, existing 3D sensing systems are typically designed for a particular application and NUI modality. This means that, for example, a system which is designed to detect mid-air interactions is typically unable to detect touch on surfaces and similarly a system which is designed to detect 3D hand gestures is typically unable to distinguish between touch and hover events. Whilst some existing systems could be extended to work for multiple modalities, this would require huge processing power, making it impractical for all but a few specialist applications.

Figure 1:
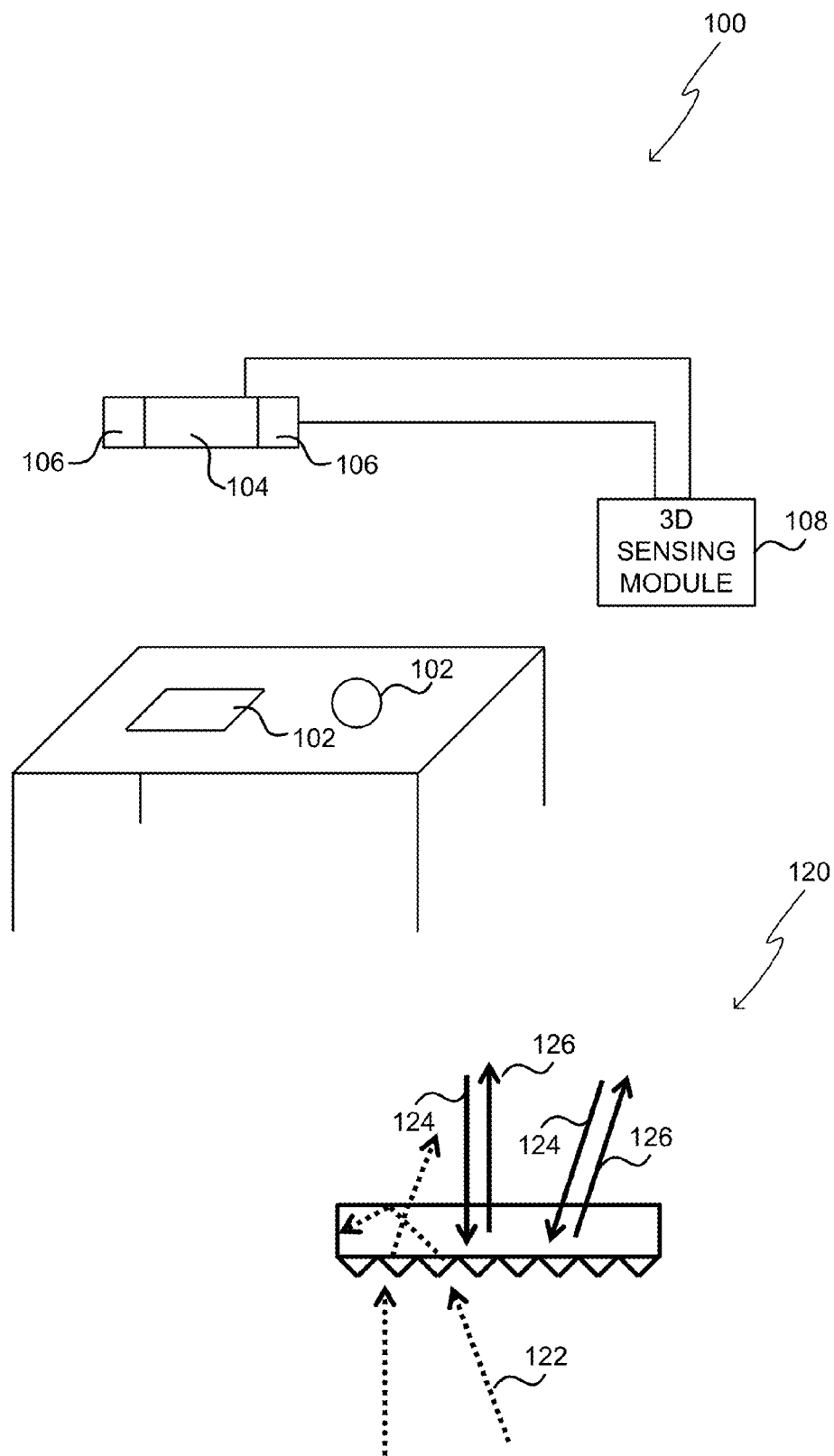
FIG. 1 shows a schematic diagram of a 3D sensing system and a cross-section through an example retroreflector.

FIG. 1 is a schematic diagram of a 3D sensing system 100 which is arranged to simultaneously track both a retroreflector 102 (or retroreflective surface) and an object which partially occludes the retroreflector, which may for example be a user's hand or fingers. This enables interaction by a user both on and above physical surfaces. As is described in more detail below, in various examples the 3D sensing system 100 is further configured to sense only the 3D silhouette of the retroreflector and any partially occluding objects and does not provide a true depth map of the scene or of objects in the scene.

By tracking both the retroreflector 102 and an object which occludes the retroreflector (such as a user's hand or fingers), the system 100 can be used with retroreflectors of any shape and size and/or with more than one retroreflector. Furthermore, the retroreflectors do not need to be fixed in position relative to the stereo camera (as is the case in systems which do not track the retroreflector but instead precisely determine its position in a calibration stage) but can be moved. This ability to accommodate retroreflectors that are movable enables new NUI input modalities based on the position/orientation of retroreflector and, in some examples, based also on the position/orientation of the occluding object relative to a movable retroreflector.

As shown in FIG. 1, the 3D sensing system 100 comprises a stereo camera 104, a light source 106 (shown in FIG. 1 as a ring light source around the stereo camera) and a 3D sensing module (or engine) 108 which controls the operation of both the stereo camera 104 and the light source 106 and simultaneously tracks, via the camera 104, both a retroreflector 102 and an object between the retroreflector 102 and the camera 104 which partially occludes the retroreflector 102. The system 100 further comprises one or more retroreflectors 102 and is arranged such that, in the absence of any occluding objects, there is line-of-sight between the retroreflector(s) 102 and the camera 104 and it is this line-of-sight which is interrupted by the object which partially occludes the retroreflector. At least one of the retroreflectors 102 is not fixed and may be moved relative to the camera 104 and/or other retroreflectors 102.

The output of the 3D sensing module 108 may be used to control the operation of a computing device which may be separate from (and in various examples remote from) the 3D sensing module or alternatively, the 3D sensing module 108 may be integral to the computing device which it controls.

FIG. 1 also shows a cross-section 120 through an example retroreflector 102. As shown in the cross-section 120, transmitted light 122 is scattered or redirected but input light 124 (e.g. from light source 106) is reflected back (as indicated by arrows 126) to the source with a minimum of scattering.

Although the system 100 is shown in FIG. 1 as being orientated to view retroreflectors placed on a horizontal surface (table 110) it will be appreciated that this is shown by way of example only and the system may be oriented differently. In another example, the retroreflectors may be magnetic or otherwise affixed to (but movable on) a vertical surface and the system 100 may be oriented to view this vertical surface. In further examples, the surface may be at any orientation and the system 100 may be oriented to view the surface on which the retroreflectors are placed. In further examples, the retroreflectors need not be on the surface and instead the retroreflectors may be objects which are manipulated by a user (e.g. a retroreflective stylus or wand) above or in front of the surface. Although in many examples described below the retroreflectors are shown as planar objects, the retroreflectors may have any shape.

The operation of the system 100 can be described with reference to the flow diagram shown in FIG. 2. The 3D sensing module 108 generates a trigger pulse (block 202) which causes the stereo camera 104 to capture image(s) of the scene at the same time as the light source 106 is on (block 204) i.e. the illumination provided by the light source may be synchronized with the image capture (or may be always on). In various examples, very strong illumination is pulsed for a very short period (e.g. 1 ms) to increase the signal-to-noise ratio (i.e. the light source is pulsed to a level much brighter than any ambient IR sources). The captured image(s) are then analyzed by the 3D sensing module 108 (block 206). Although the following description refers to processing a single image pair (e.g. a left image and a right image captured simultaneously), it will be appreciated that in many examples, a series of image pairs are captured, for example at a pre-defined frame rate (e.g. 60 Hz). The analysis is performed (in block 206) frame by frame in real time (and the processing of one frame is independent of any previous processing) and any suitable analysis technique (including any suitable depth extraction algorithm) may be used.

The stereo camera 104, light source 106 and retroreflector 102 all operate in the same wavelength range, e.g. using visible light or alternatively using infra-red (IR) light. In various examples, the stereo camera 104 is arranged to capture IR light (e.g. there may be an IR bandpass filter on the camera), the light source 106 comprises one or more IR light emitting diodes (LEDs), and the retroreflector 102 is arranged to reflect IR light (but may be transparent at other wavelengths). In other examples, the camera 104, light source 106 and retroreflector 102 may operate within the visible spectrum.

The stereo camera 104 is arranged (in block 204) to simultaneously capture two images of the scene, a left image and a right image. There are many different ways in which this may be achieved and in various examples, the stereo camera 104 comprises two monochrome IR cameras 302 at a fixed spacing, s, (e.g. ~6 cm apart), as shown in the first example 31 in FIG. 3. In this example, the cameras 302 are positioned on a metal rail 304. Each of the cameras 302 captures a separate image of the scene (i.e. the left and right image of an image pair) and the images are captured simultaneously (or substantially simultaneously) by both cameras 302. The light source comprises a ring of 8 diffuse IR LEDs 306 attached around the lens of each camera 302. This arrangement of LEDs 306 provides uniform illumination and minimizes shadows within the scene.

Figure 3:
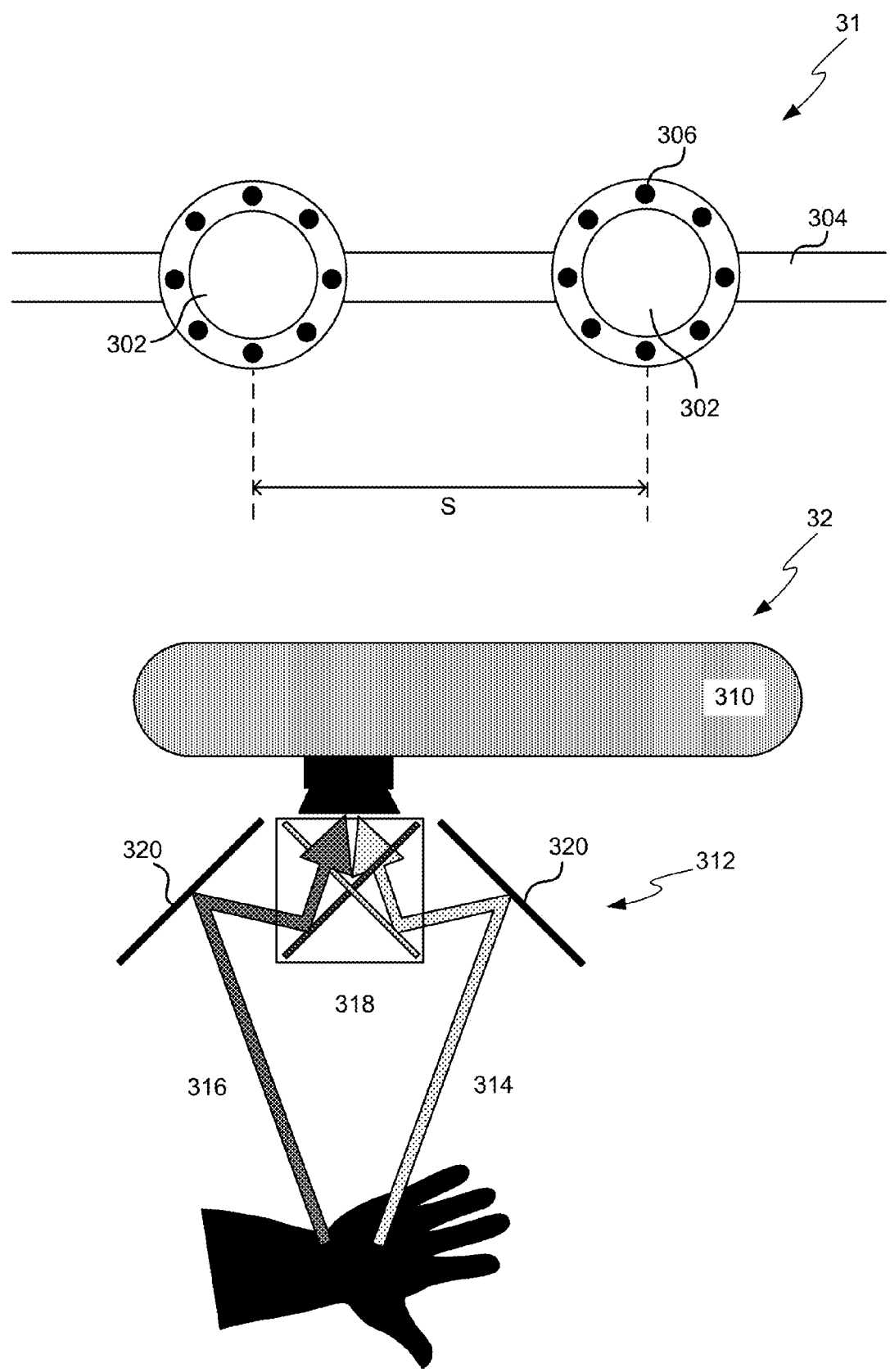
FIG. 3 shows two examples of the stereo camera and light source arrangement from the system of FIG. 1.

The second example 32 in FIG. 3 shows an alternative arrangement which uses a single RGB camera 310, which may for example be a camera in a smart phone or other mobile device (e.g. tablet computer). An optical arrangement 312 is used to enable the camera 310 to capture the two images (a left and right image) as indicated by the arrows 314, 316 although these are stored as a single RGB image by the camera 310. The optical arrangement 312 combines the two images (e.g. a blue image and a red image) using a RGB combining prism 318 and mirrors 320 (or similar optical elements) into a single RGB image stored by the camera. In this example, the light source may be a built-in LED flash in the mobile device.

Figure 4:
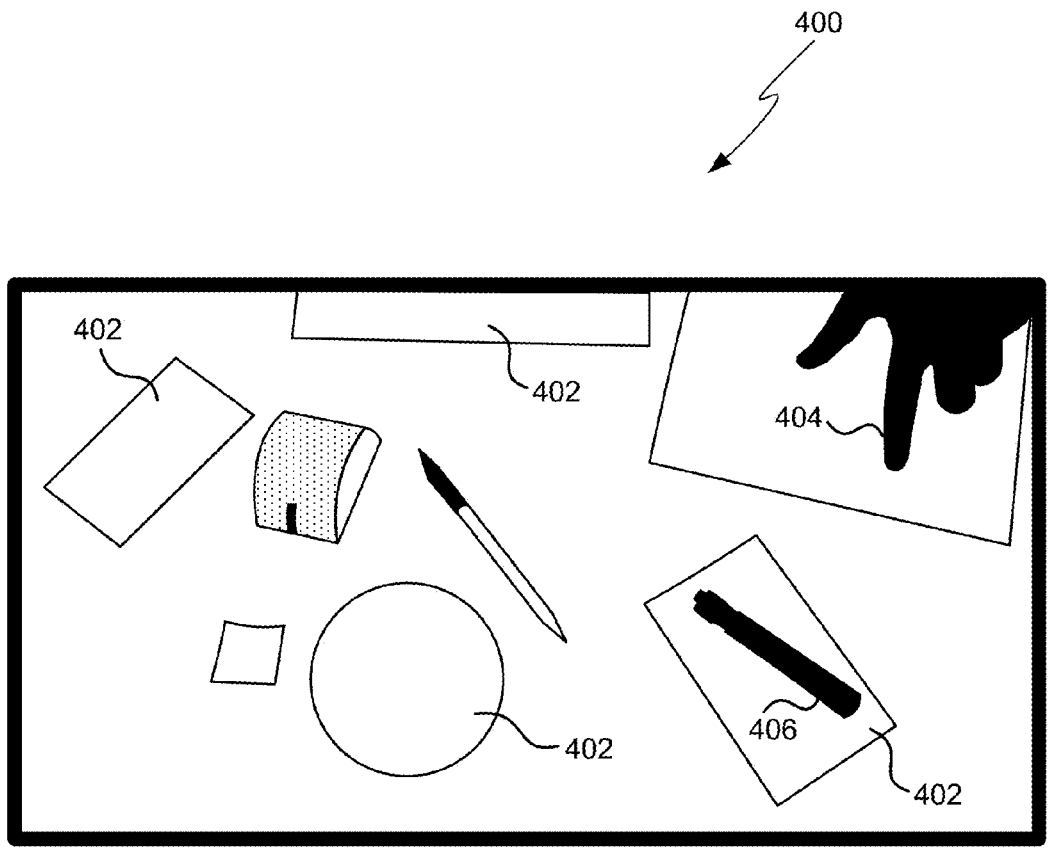
FIG. 4 shows an example of a captured image.

FIG. 4 shows an example of a captured image 400 (e.g. the image captured by one of the two cameras 302 in example 31 in FIG. 3). As can be seen from the image 400, the illumination provided by the light source causes a bright uniform response from all the retroreflective materials (there are many retroreflectors in this example scene) on the surface (e.g. on table 110 in FIG. 1). This makes the retroreflectors clearly distinguishable as bright silhouettes 402. Objects which are between a retroreflector and the camera and hence partially occludes the retroreflector, such as the hand 404 and pen 406 shown in FIG. 4, are shown as dark silhouettes against the bright retroreflector silhouettes 402. This provides a sharp contrast between the background (silhouettes 402) and foreground (objects 404, 406). It can therefore be seen that the optical arrangement within the system 100 enables rapid detection of the edges of both the retroreflector and an object which partially occludes the object.

Where an RGB optical arrangement is used, as shown in the second example 32 in FIG. 3, each of the captured images will comprise dark silhouettes corresponding to objects between the retroreflector and the camera against different color bright silhouettes (e.g. a dark silhouette of a hand against a red background in the first image and a dark silhouette of the same hand against a blue background in the background image). The stored image will therefore comprise the combination of these two images, with two slightly different (e.g. offset) shadows of the hand against a colored (e.g. magenta) background.

Any reference in the following description to one of the particular arrangements shown in FIG. 3 is by way of example only and the methods are equally applicable irrespective of which of the two arrangements are used or if any arrangement as described with respect to the system of FIG. 1 is used.

As described above, the retroreflectors 102 may have any shape/size and in various examples the retroreflectors 102 may be formed from a retroreflective material which may be sewn, painted or stuck on to another object (e.g. a computer mouse, a piece of cardboard, etc.) or 2D/3D printed. At least one of the retroreflectors 102 is not in a fixed position relative to the stereo camera 104 (e.g. it can be moved by a user). The retroreflectors 102 which are not in a fixed position relative to the stereo camera 104 may be referred to as 'retroreflective widgets' to differentiate them from retroreflective backgrounds which have a fixed position relative to a camera in systems which carefully calibrate the retroreflector's position prior to use.

In various examples a retroreflector may have labels on it which are visible to the user but transparent at the wavelengths captured by the stereo camera. For example, where the stereo camera captures IR light, the labels may be transparent to IR light but visible to the human eye (e.g. printed using dye-based printer ink or written using colored whiteboard markers). These labels may, for example, provide a user interface layout such as a keyboard layout, custom user interface (UI) or DJ mixing desks.

Figure 5:
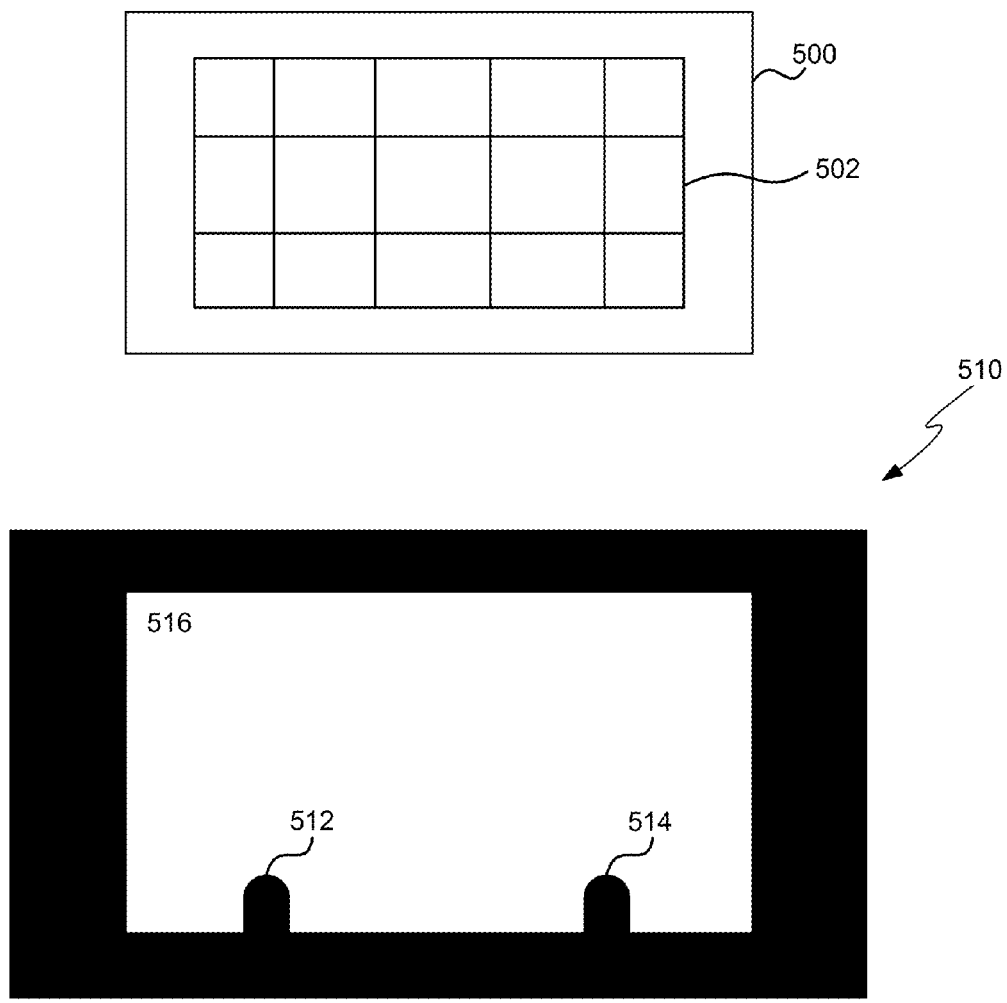
FIG. 5 shows a schematic diagram of an example retroreflector with a custom UI interface on top of it and an example of a captured image of the retroreflector.

FIG. 5 shows a schematic diagram of an example retroreflector 500 with a custom UI interface on top of it in the form of a grid of lines 502 formed in a material (e.g. ink) that is transparent at the wavelengths used by the stereo camera but visible to a user. When a user interacts with the UI, the stereo camera captures images (e.g. silhouettes) showing the position of a user's fingers within the grid, e.g. as shown in example image 510. In the example shown, dark silhouettes 512, 514 of two fingertips can be seen against the bright silhouette 516 of the retroreflector 500. These two fingertips are partially occluding the retroreflector 500 as they are placed between the retroreflector and the stereo camera (or where there are two cameras, between the retroreflector and the camera capturing the image). It can be determined (based on analysis of the captured images in block 206 of FIG. 2) that in this example the two fingertips have been placed in the bottom squares of the second and fourth columns of the custom UI grid 502. An output from the 3D sensing module 108 identifying the positions of the fingertips may trigger different actions or operations within a computing device based on particular fingertip positions or combinations of positions.

Figure 6:
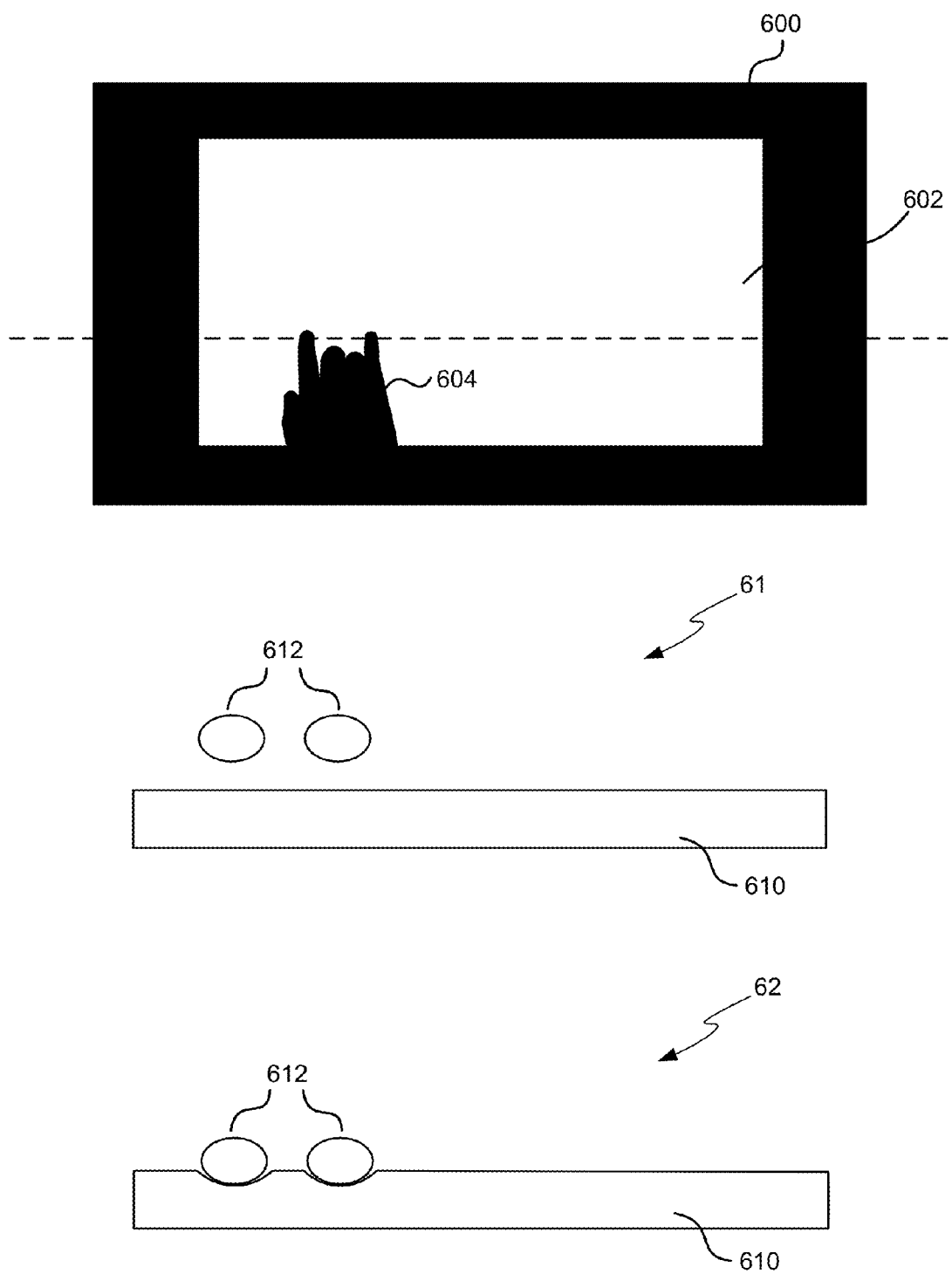
FIG. 6 shows another example of a captured image and two cross-sections through the imaged scene.

In various examples, a retroreflector may be formed from a malleable material (e.g. a malleable sheet material) and as both the occluding object (e.g. a user's hand) and the retroreflector itself are tracked by the 3D sensing module 108, the 3D sensing module can distinguish between hover and touch events. This is shown in the schematic diagrams in FIG. 6. FIG. 6 shows a captured image 600 of a bright silhouette 602 of a retroreflector which is partially occluded by a user's hand, which therefore appears as a dark silhouette 604. If only the foreground object (the user's hand) is tracked, it is not possible for the 3D sensing module to discriminate between the user's hand hovering as shown in the first cross-section diagram 61 and the user's hand touching the retroreflector as shown in the second cross-section diagram 62. Each cross-section is shown in a position corresponding to the dotted line 606 across image 600 and so shows the malleable retroreflective widget 610 and two of the user's fingers 612. This is described in further detail below in relation to discussing possible methods of analysis. The malleable retroreflective widget 610 may, for example, have a transparent label on its upper surface as described above (e.g. the grid 502 shown in FIG. 5).

Figure 7:
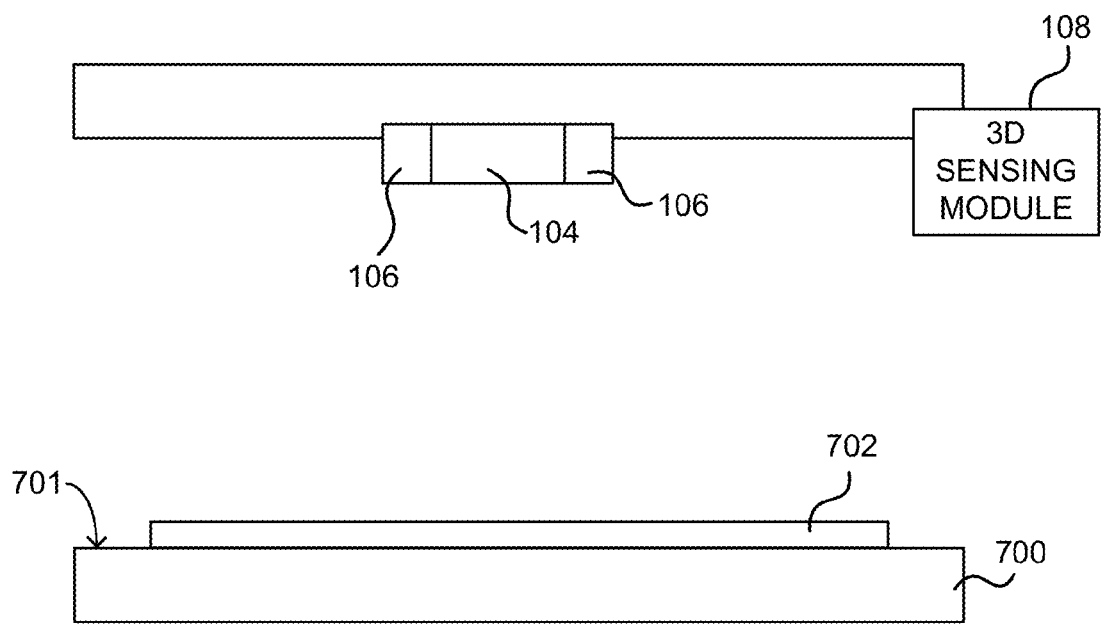
FIG. 7 is a schematic diagram of a 3D sensing system comprising a transparent retroreflector.

In various examples, a retroreflector 102 may be transparent to visible light such that a user can see through it. This may, for example, provide an alternative means of creating a user interface layout (e.g. as described above with reference to FIG. 5). In such an example, the user interface layout may be printed (or otherwise formed) on an upper surface 701 of an object 700 onto which a transparent retroreflector 702 is affixed, as shown in FIG. 7. Light from the light source 106 is reflected back to the stereo camera 104 by the retroreflector 702; however a user can see through the retroreflector 702 and observe any text or other markings on the upper surface 701 of the support object 700.

In an example, a transparent retroreflector 702 may be formed by covering the surface topology of the retroreflector (which may, for example, comprise an array of microspheres or a corner-cube reflectors) with an index-matching material, where the index-matching material matches the index for visible light and not for the wavelength(s) used by the light source 106 and stereo camera 104. In other examples, a retroreflector array which reflects IR may be made visibly transparent by providing an embedded, wavelength selective, reflective coated retroreflective surface 1204 (which reflects IR but transmits visible wavelengths, IR-R/Visible-T) as shown in the example cross-section 1202 in FIG. 12. The embedded surface 1204 (or layer) may be made wavelength selective by, for example, using a dichroic coating or Rugate coating. Within this cross-section 1202, adjacent layers are index-matched (e.g. $n_1=n_2$) and the entire optical stack may have an anti-reflective (AR) coating 1206 on one or both sides. On the back side of the transparent retroreflector, there may be a laminated substrate 1208 or an outer molded fill layer with no substrate. Example applicable retroreflective surfaces include (1) full corner cube array, (2) tri-cut type array such as used in Reflexite® or (3) other improved efficiency design profiles such as used in 3M™ high efficiency retroreflectors. A broadband partially transparent coating (such as a metal coating) may also be used to achieve partial transparency function, but will result in partial loss of IR retroreflected light efficiency.

Figure 12:
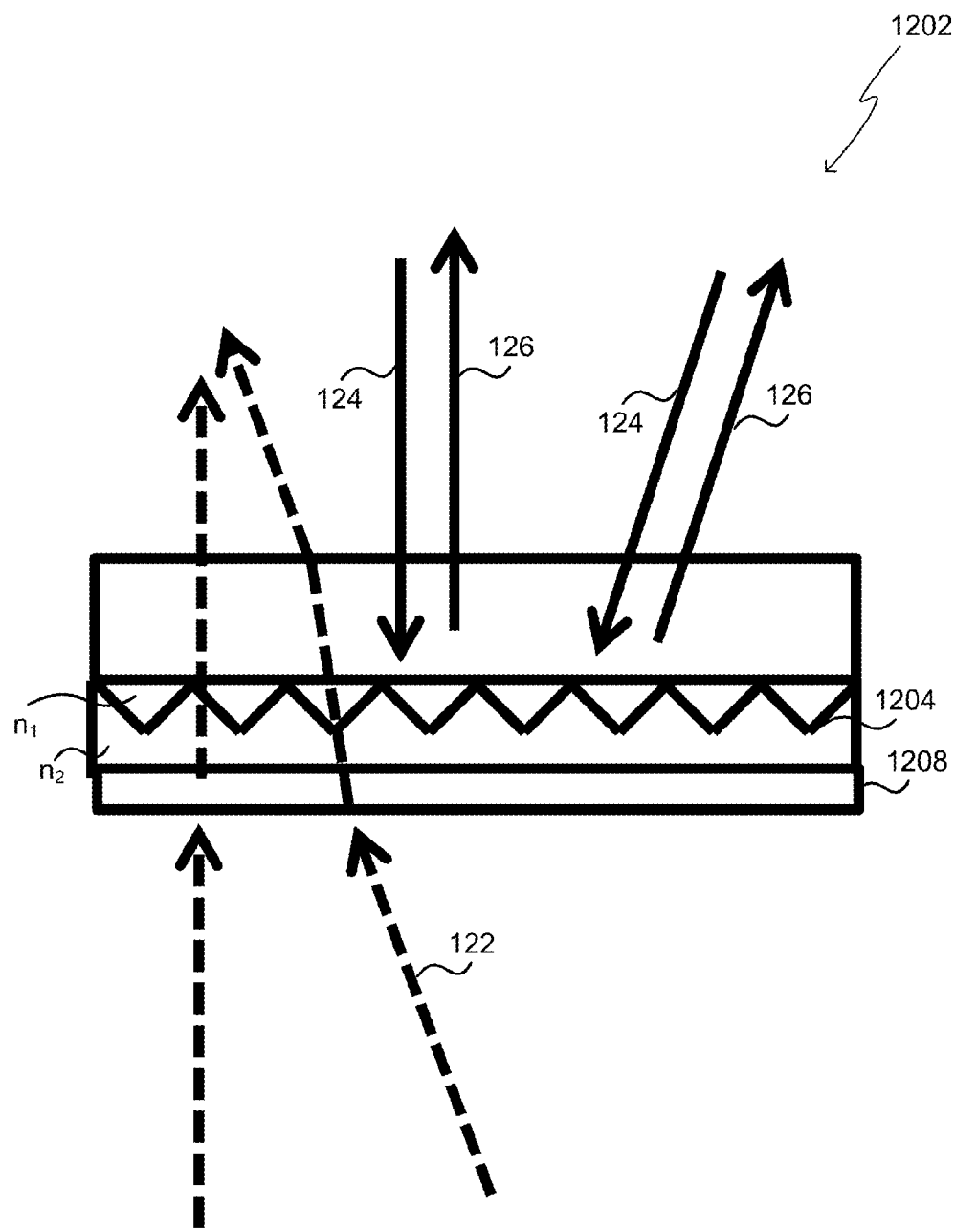
FIG. 12 shows a cross-section through an example transparent retroreflector.
Figure 13:
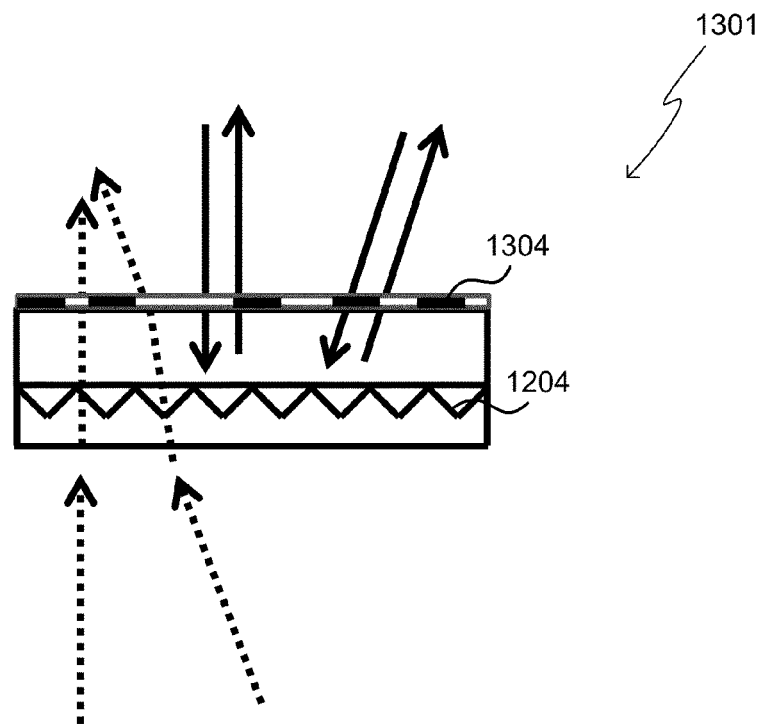
FIG. 13 shows cross-sections through two example visibly-transparent, infra-red reflective retroreflector arrays.
Figure 13:
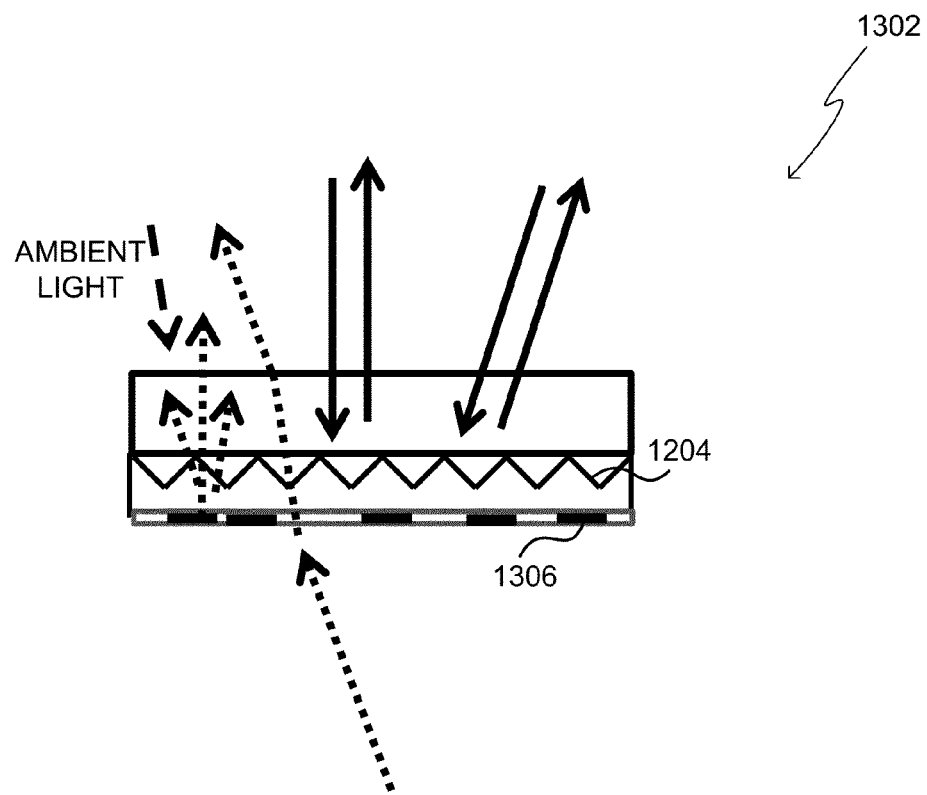

The embedded, wavelength-selective, reflective coated retroreflective surface (IR-reflect/Visible-transmit) 1204 shown in FIG. 12 may also be used to provide a custom UI, as described above with reference to FIG. 5 and two example cross-sections 1301, 1302 are shown in FIG. 13. In the first example 1301, an IR-transparent colored ink 1304 is printed on the front surface of the retroreflector (or on a film layer added to the front of the retroreflector) to allow partially see-through visible content on the retroreflector sheet. The second example 1302, in contrast, comprises a printed display content layer 1306 on the back side. This layer 1306 may, for example, be formed by direct printing on the back side or by laminating a placard (which may be removable and interchangeable to provide different UI layouts) onto the back side. In various examples, the placard may include opaque, partially reflective or partially transmissive regions as well as clear or diffuse regions (e.g. by use of a clear/diffuse printing substrate layer and various types of ink which may be translucent, opaque or diffuse).

As described above, the analysis performed on the captured images (in block 206) is performed frame by frame in real time and any suitable analysis technique (including any suitable depth extraction algorithm) may be used. An example method of analyzing the captured images, which may be used in block 206 of FIG. 2, is shown in the flow diagram of FIG. 8.

Figure 8:
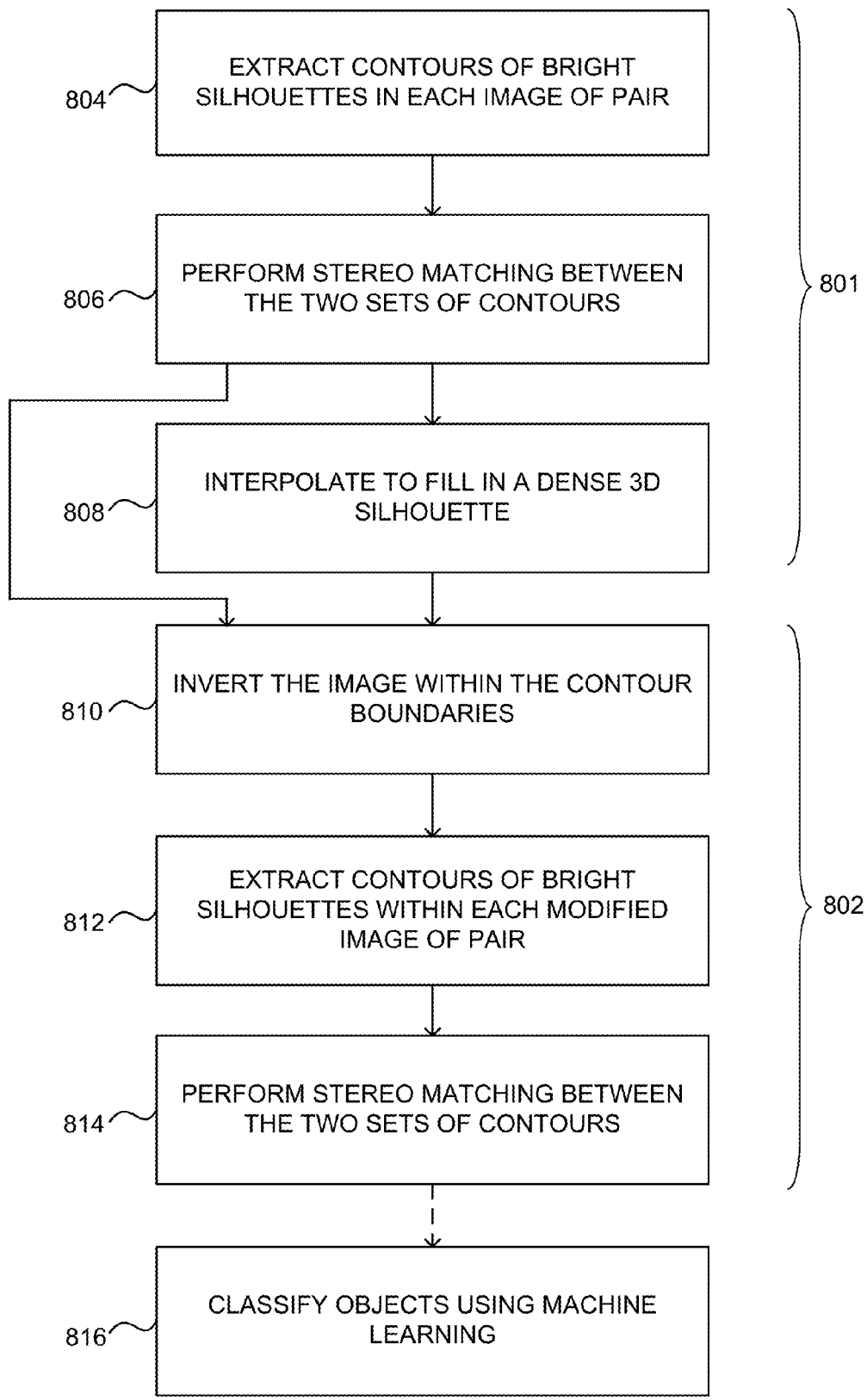
FIG. 8 is a flow diagram of an example method of analyzing the captured image pairs.

As shown in FIG. 8, the example method of analyzing the captured images comprises two passes 801, 802 and the method is performed for each pair of images (e.g. left image and right image) captured by the stereo camera 104. The first pass (or stage) 801 computes the depth for the background image which is considered to comprise the parts of the image which are brightly lit (i.e. the retroreflectors). The second pass (or stage) 802 computes depth for the foreground image, where objects within the silhouette from the first pass are segmented.

In the first pass 801, the contours of any bright silhouettes in each image of the pair of images are extracted (block 804). As part of extracting the contours, each image may be thresholded to remove low intensity pixels. The contour of each binary image is then traced, which efficiently computes a set of 2D pixel coordinates corresponding to contour points for each connected component (the coordinates are 2D as at this stage there is no depth information).

Figure 9:
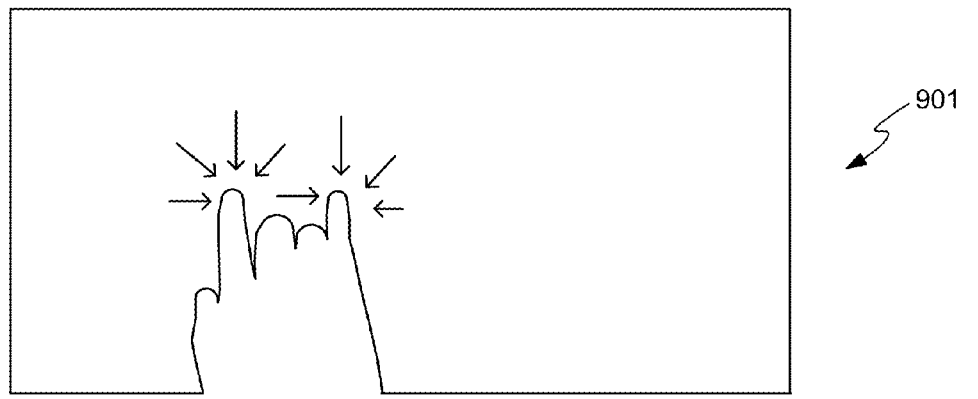
FIG. 9 shows example extracted contours and an inverted image.
Figure 9:
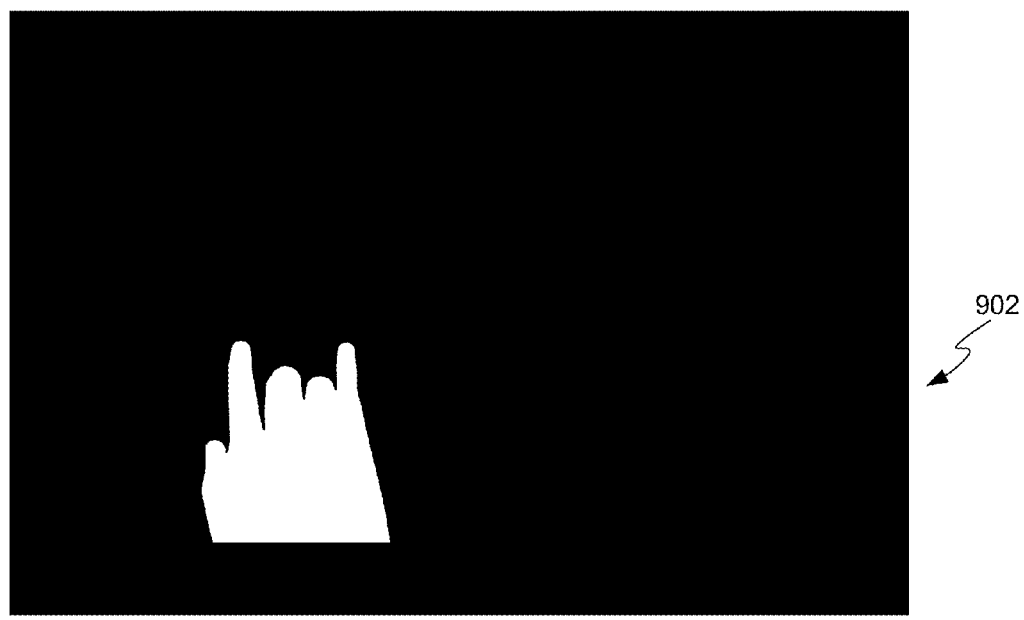
Figure 9:
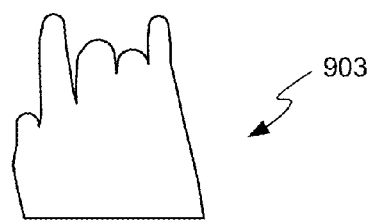

Referring by way of example back to the image 600 shown in FIG. 6 which showed a single bright silhouette 602, the extracted contour from this particular image (from block 804) would be as shown in the first diagram 901 in FIG. 9. For each bright silhouette, a pair of contours is extracted, one from the right image and one from the left image in the pair (in block 804). As there may be more than one bright silhouette in any scene, the output of this extraction stage is two sets of contours—each set of contours being extracted from a different one of the left and right images in the image pair.

Stereo matching is then performed between the two sets of contours (block 806). Any suitable stereo matching algorithm may be used and an example is described on co-pending US patent application entitled 'STEREO IMAGE PROCESSING USING CONTOURS' filed on the same day as this application. stereo matching (in block 806) generates a 3D depth contour for each bright silhouette, where the 3D depth contour comprises data describing a series of points in 3D space (e.g. a series of points around the silhouette 901 with each point being defined by its (x,y,z) coordinates). Having performed stereo matching (in block 806), interpolation may optionally be performed within the 3D depth contour to fill in a dense 3D silhouette (block 808). This interpolation may be used where the system 100 is used with algorithms that were designed to work with dense depth images. This interpolation (in block 808) may be referred to as 'contour inpainting' and is described in more detail below.

In the second pass 802, each image in the pair of images is inverted within the contour boundaries (block 810), i.e. within the contour boundaries as extracted in block 804 in the first pass 801. Referring back to the image shown in FIG. 4 which showed a dark silhouette of a whiteboard marker 406 against a bright (white) silhouette 402 of a retroreflector, this inversion (in block 810) would result in a modified image in which the whiteboard marker was a bright silhouette against a black background of the retroreflector.

Where the occluding object is not fully within the bright silhouette, like the user's hand in the example shown in image 600 in FIG. 6 (and unlike the whiteboard marker shown in FIG. 4), some additional processing is required when performing the inversion and it will be appreciated that this may be performed in all cases (without first determining whether an occluding object is fully within a bright silhouette or not).

Prior to performing the inversion (in block 810), the convex hull of the background contour (from block 804) is generated. From the convex hull, a binary mask is generated for each camera image (e.g. where the mask has a value 1 for pixels within the convex hull and a value 0 for pixels outside the convex hull). For each valid pixel in the mask (i.e. where the mask has a value of 1), the binary image is then inverted (in block 810).

Referring by way of example back to the extracted contour shown in the first diagram 901 in FIG. 9 (which corresponds to image 600 in FIG. 6), the convex hull of this contour is a rectangle, the results of the inversion (in block 810) within the convex hull of the contour is a modified image as shown in the second diagram 902 in FIG. 9. It can be seen from FIG. 9 that this modified image shows the part of the user's hand that occluded the retroreflector as a bright silhouette against a dark background.

The output from the inversion stage (in block 810) are a pair of modified images (a modified left image and a modified right image) in which there are bright silhouettes which correspond to the objects which are interacting on or above a retroreflector and consequently partially occlude the retroreflector (as seen from the camera). The method then proceeds in a similar manner to the first pass 801 with contours being extracted from each modified image in the pair (block 812). The third diagram 903 in FIG. 9 shows the corresponding contour for the modified image shown in the second diagram 902.

Having generated the contours (in block 812), stereo matching is performed on the two sets of contours generated from the modified images (block 814) using any suitable stereo matching algorithm. As described above with reference to block 806, the stereo matching (in block 814) generates a 3D depth contour for each bright silhouette, where the 3D depth contour comprises data describing a series of points in 3D space (e.g. a series of points around the silhouette 903 with each point being defined by its (x,y,z) coordinates).

Referring back to the discussion above regarding distinguishing between touch and hover (as shown in FIG. 6), the 3D contours generated by stereo matching in blocks 806 and 814 may be used to make this distinction. In one example, the 3D contour corresponding to the silhouette 901 in FIG. 9 will show the depression of the malleable retroreflector at the positions around the fingertips, as indicated by arrows in FIG. 9 and this may be used to indicate touch events. In another example, a surface plane of the malleable retroreflector is estimated based on the 3D contour of the retroreflector and any intersection between that plane and the 3D contour corresponding to the silhouette 903 of the user's hand is considered a touch event.

In addition to purely distinguishing between touch and hover, the 3D contours may also be used to give an approximation of pressure (e.g. the amount of pressure applied by the fingertips 612 on the malleable retroreflector 610). For example, the pressure may be approximated based on the amount of intersection/overlap between the plane of the retroreflector and the 3D contour corresponding to the silhouette of the user's hand.

Prior to the first pass 801 shown in FIG. 8, the images captured by the stereo camera may be processed to provide improved input images to the method shown in FIG. 8. An example processing method is shown in the flow diagram in FIG. 10 and as with the method in FIG. 8, the method of FIG. 10 is performed at run-time and in real time.

Figure 10:
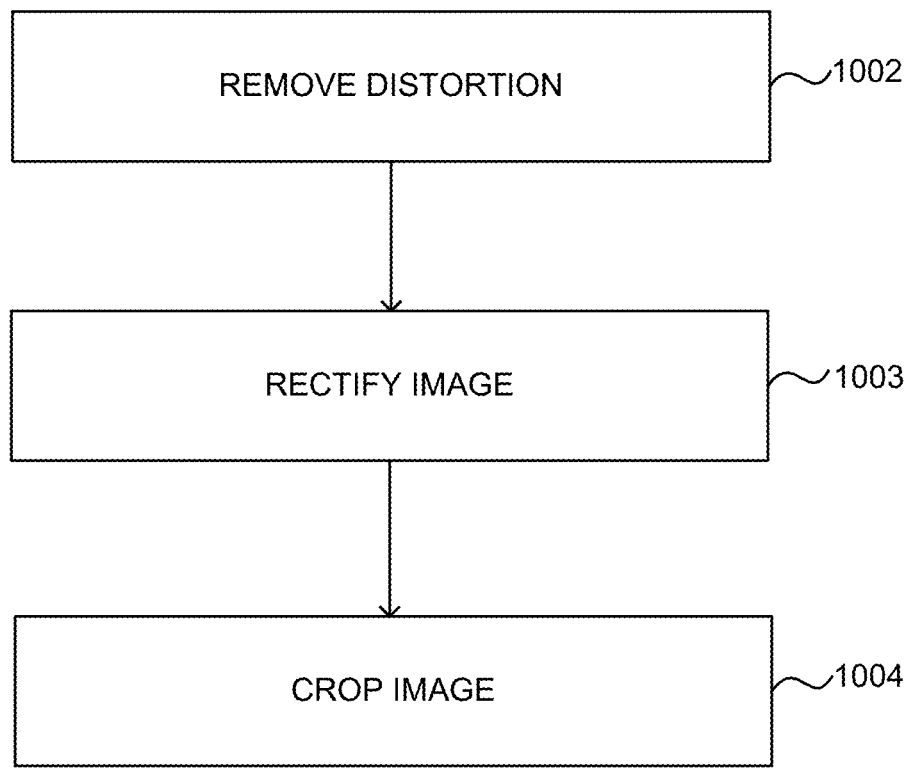
FIG. 10 is a flow diagram of an example method of processing the captured images prior to performing any analysis.

As shown in FIG. 10, the synchronized captured images (from block 204 of FIG. 2) are processed to remove any distortion given intrinsic lens parameters (block 1002). The images are then rectified (block 1003) to ensure that stereo matching can occur (in blocks 806 and 814) directly across scan lines of left and right images and finally they are cropped (block 1004) to remove non-overlapping parts of the two images.

Having generated the 3D contours using stereo matching for both the retroreflectors and the occluding objects (in blocks 806 and 814), the 3D sensing module 108 (or a separate classification module) may classify the resultant shapes using a machine learning algorithm (block 816). Any suitable classification method may be used and an example is described in co-pending US patent application entitled 'CONTOUR-BASED CLASSIFICATION OF OBJECTS' filed on the same day as this application.

In various examples, because the 3D sensing system tracks both the retroreflector and objects occluding the retroreflector, particular retroreflective objects may be assigned a particular behavior (e.g. within software which is being controlled by the NUI provided by the 3D sensing system). For example, a circular retroreflector of pre-defined dimensions may be characterized (in block 816) as a dial and the position of the occluding object with respect to the dial may be used as an input to an operating system or application software. If the circular retroreflector is moved around on the surface on which it is located, the classification will not be affected because of the tracking of both the retroreflector and the occluding object. Similarly, a retroreflector which is the shape of an elongate rectangle may be classified as a slider input and the position of the occluding object with respect to the slider may be used as an input to an operating system or application software. Further examples include, but are not limited to, a 3D pointing wand where different functions can be triggered through partial occlusions with the index finger or the way the wand is held and a 3D multi-touch mouse in the form of a curved retro-reflector in the shape of a mouse that can be picked up from the surface and where clicking and multi-touch gestures can be enabled on the 3D mouse by analyzing the occlusions.

The above description of the analysis relates only to the use of silhouettes, however in some examples silhouettes alone may not or cannot be used, for example where the classification algorithm requires a fully dense depth map. This, however, does not mean that the methods described above cannot be used, but instead an optional post-processing step referred to as 'contour inpainting' may be used to generate a 3D depth map from the contours generated in the method of FIG. 8. In an example, this contour inpainting may be implemented between blocks 814 and 816 in FIG. 8.

In order to fill the interior of the segmented contour (e.g. as generated in block 814 in FIG. 8), which may be denoted $\partial\Omega$, the interpolation problem is formulated as a Laplace equation with Dirichlet boundary conditions. Hence, contour depth values define a known scalar-valued boundary function $\hat{f}(x,y)|_{\partial\Omega}$ and the method comprises solving for the interior depth values $f(x,y)$ over $\Omega$ with:

$$\Delta f(x,y)(x,y) \in \Omega - \delta\Omega$$

$$f(x,y)|_{\partial\Omega} = \hat{f}(x,y)|_{\partial\Omega} \text{ otherwise}$$

Then, a parallel Jaccobi/Gauss-Seidel solver is used on a Graphics Processing Unit (GPU) to solve the Laplace equation. In order to speed up convergence, the interior is initialized using a hierarchical pullpush interpolation with bi-cubic interpolation weights (e.g. as described in Marroquim et al 'Efficient point-based rendering using image reconstruction, published in SPBG (2007), 101 -108). In performing the method, the pixels values of $\partial\Omega$ are marked with a negative sign, which allows the method (except for the pull-push hierarchy) to solve the system in place.

The above description of the analysis relates to the operation at run-time. A calibration process may be performed offline (i.e. ahead of run-time) which comprises: 1) intrinsic calibration to compute the geometric parameters of each IR camera lens (focal length, principal point, radial and tangential distortion); 2) stereo calibration to compute the geometric relationship between the two cameras, expressed as a rotation matrix and translation vector; 3) stereo rectification to correct the camera image planes to ensure they are scanline-aligned to simplify disparity computation.

Figure 11:
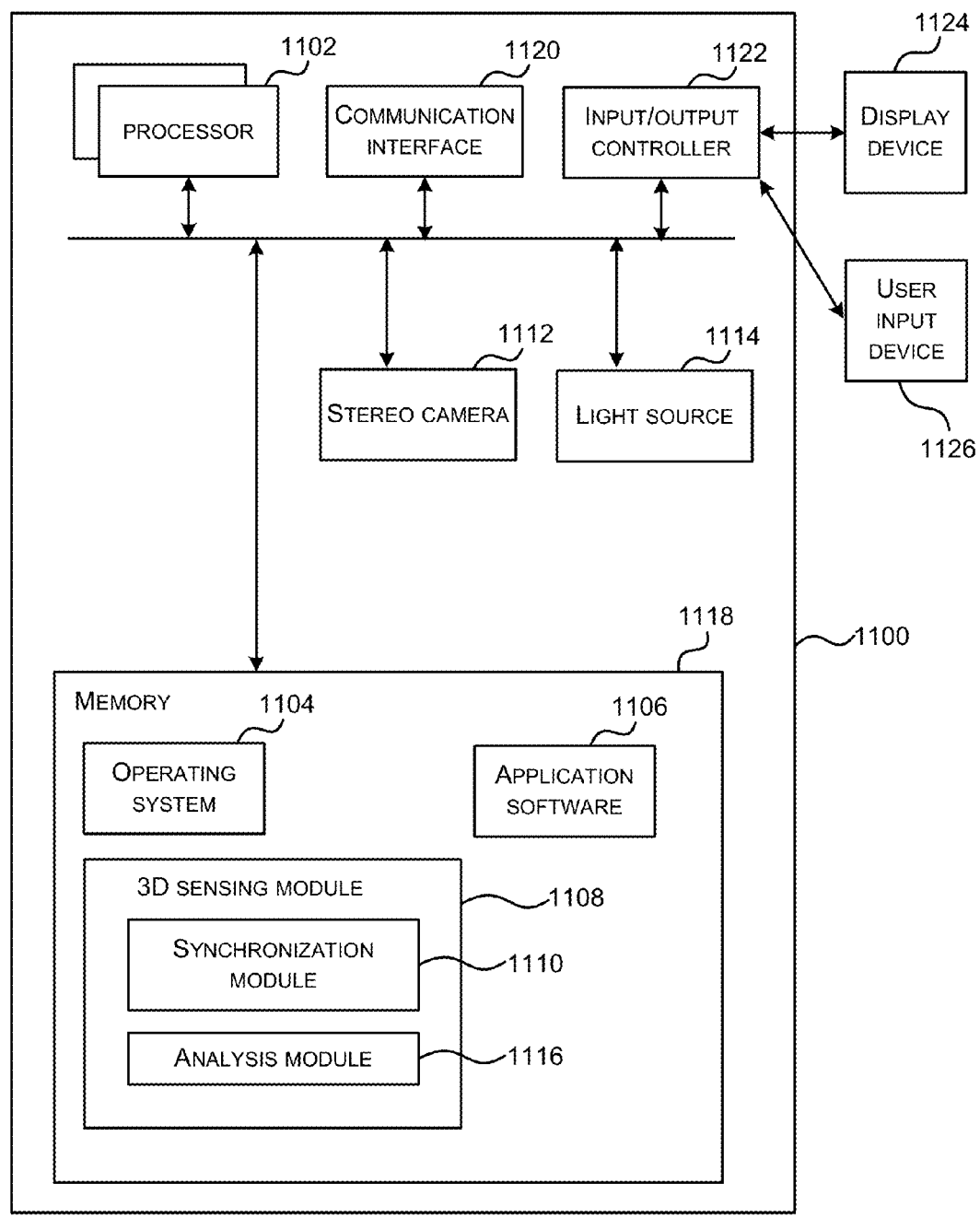
FIG. 11 illustrates an exemplary computing-based device in which embodiments of the methods described herein may be implemented.

FIG. 11 illustrates various components of an exemplary computing-based device 1100 which may be implemented as any form of a computing and/or electronic device, and in which embodiments of the methods described herein may be implemented. In particular, the 3D sensing module 108 in FIG. 1 may be integral to the computing-based device 1100 and implemented in software (as described below) or in hardware logic components or in a combination of hardware logic components and software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

Computing-based device 1100 comprises one or more processors 1102 which may be microprocessors, controllers or any other suitable type of processors for processing computer executable instructions to control the operation of the device in order to perform 3D silhouette sensing, as described above. In some examples, for example where a system on a chip architecture is used, the processors 1102 may include one or more fixed function blocks (also referred to as accelerators) which implement a part of the method of 3D silhouette sensing in hardware (rather than software or firmware). As described above, one of the processors may be a GPU which is arranged to perform contour inpainting. Platform software comprising an operating system 1104 or any other suitable platform software may be provided at the computing-based device to enable application software 1106, which may include a 3D sensing module 1108, to be executed on the device.

As shown in FIG. 11, the 3D sensing module 1108 may comprise a synchronization module 1110 which generates the trigger pulse to cause the stereo camera 1112 and the light source 1114 to simultaneously capture a pair of images and illuminate the scene. As described above, the stereo camera 1112 and/or light source 1114 may be entirely or partially integrated within the computing-based device 1100 (e.g. where the computing-based device is a mobile device and the arrangement shown in the second example 32 in FIG. 3 is used) as shown in FIG. 1, or alternatively the stereo camera 1112 and light source may be external to the computing-based device 1100 (e.g. where the arrangement shown in the first example 31 in FIG. 3 is used). Where the 3D sensing module 1108 is implemented at least partially in hardware, the synchronization module 1110 may be a synchronization board.

Figure 2:
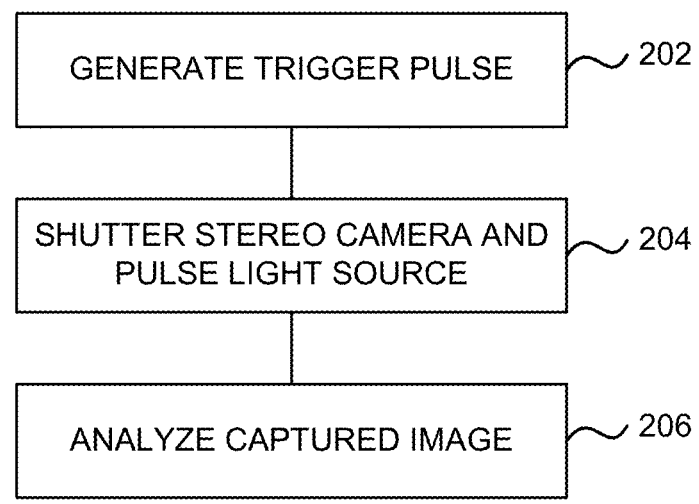
FIG. 2 is a flow diagram of an example method of operation of a 3D sensing system.

The 3D sensing module 1108 further comprises an analysis module 1116 which is arranged to analyze the captured images (e.g. as in block 206 of FIG. 2). It will be appreciated that in some examples, the analysis module 1116 may be external to the 3D sensing module 1108. The output of the analysis module 1116 may be input to a separate classification engine (e.g. arranged to perform the method of block 816 in FIG. 8) or the classification may be performed within the analysis module 1116. The output from the classification is provided as an input to the operating system 1104 and/or application software 1106 such that the motion of the retroreflectors and/or occluding objects provides a NUI to the computing-based device.

The computer executable instructions may be provided using any computer-readable media that is accessible by computing based device 1100. Computer-readable media may include, for example, computer storage media such as memory 1118 and communications media. Computer storage media, such as memory 1118, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1118) is shown within the computing-based device 1100 it will be appreciated that the storage may be distributed or located remotely and accessed via a network or other communication link (e.g. using communication interface 1120).

The computing-based device 1100 may also comprise an input/output controller 1122 arranged to output display information to a display device 1124 which may be separate from or integral to the computing-based device 1100. The display information may provide a graphical user interface. In various examples, the input/output controller 1122 may also arranged to receive and process input from one or more devices, such as a user input device 1124 (e.g. a mouse, keyboard, camera, microphone or other sensor) which may receive user input in addition to the user input received via the 3D sensing system described herein. The 3D sensing system described herein is arranged to detect user gestures or other user actions and may provide a NUI. The user input device 1124 may also be a NUI device (e.g. it may detect voice) or may use a more convention input means such as button/key presses. This user input may be used to control the operating system 1104 and/or application software 1106 running on the computing-based device 1100 or on another computing-based device. In an embodiment the display device 1124 may also act as a user input device 1126 if it is a touch sensitive display device. The input/output controller 1122 may also output data to devices other than the display device, e.g. a locally connected printing device (not shown in FIG. 11).

As described above, any of the input/output controller 1122, display device 1124 and the user input device 1126 may comprise NUI technology which enables a user to interact with the computing-based device in a natural manner, free from artificial constraints imposed by input devices such as mice, keyboards, remote controls and the like. In addition, the 3D sensing system comprising the stereo camera 1112, light source 1114 and 3D sensing module 1108 acts as a NUI device, as described above. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods). As described above, the 3D sensing system described herein (which comprises the stereo camera 1112, light source 1114 and 3D sensing module 1108) is arranged to track simultaneously both a retroreflector and objects occluding the retroreflector and can consequently enable user input through touch and/or object recognition and/or gesture recognition both on a retroreflector and in the interaction space above the retroreflector.

Although the present examples are described and illustrated herein as being implemented in a computing-based device 1100 as shown in FIG. 11 where the 3D sensing module 1108 controls the computing-based device in which it is located, the system described is provided as an example and not a limitation. As those skilled in the art will appreciate, the present examples are suitable for application in a variety of different types of systems and in other examples the 3D sensing module 1108 may be used to control (via the inputs received via the NUI interface) a second computing-based device with the output of the 3D sensing module being communicated to that second computing-based device via the communication interface 1120.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A 3D sensing system comprising:
   a stereo camera, the stereo camera including an infra-red camera;
   a light source; and
   a 3D sensing module arranged to track a retroreflector during a time that an object partially occluding the retroreflector is tracked by the 3D sensing module using image pairs captured by the stereo camera, and to detect a touch event or determine a pressure value based at least in part on a depression of the retroreflector;
   the 3D sensing module further comprising a synchronization module arranged to generate a trigger pulse to trigger capture of a pair of images by the stereo camera and simultaneous illumination by the light source and an analysis module arranged to analyze the captured images to simultaneously track both the retroreflector and the object partially occluding the retroreflector, the analysis module further arranged to analyze the captured images to generate a 3D contour of each of the retroreflector and the object by extracting a 2D contour of the retroreflector and a 2D contour of the object from each image in an image pair and performing stereo matching between the 2D contours from each image in the image pair; and
   the 3D sensing module further arranged to remove distortion from each image in the image pair, rectify each image in the image pair, and identify parts of each image to not consider parts of the scene not contained in the other image in the image pair in the analysis.

2. The system according to claim 1, wherein the retroreflector is movable relative to the stereo camera.

3. The system of claim 2, wherein the retroreflector is transparent at visible wavelengths of light and retroreflective at a wavelength range captured by the stereo camera.

4. The system of claim 2, wherein the retroreflector comprises a user interface layout formed on an upper surface of the retroreflector, wherein the user interface layout is transparent at a wavelength range over which the retroreflector retroreflects.

5. The system of claim 1, the 3D sensing module being at least partially implemented using hardware logic selected from any one or more of: a field-programmable gate array, a program-specific integrated circuit, a program-specific standard product, a system-on-a-chip, a complex programmable logic device.

6. The system according to claim 1, wherein the stereo camera comprises a pair of infra-red (IR) cameras at a fixed spacing.

7. The system according to claim 1, wherein the light source comprises a plurality of diffuse IR LEDs arranged around a lens of the infrared camera.

8. The system according to claim 1 further comprising a printed display content placard arranged to be removably placed on a back side of the retroreflector.

9. A method of 3D sensing comprising:
   generating a trigger pulse to cause a stereo camera to capture a pair of images of a scene during a time that the scene is illuminated by a light source;
   analyzing the pair of images to track both a retroreflector in the scene and an object partially occluding the retroreflector and to detect a touch event or determine a pressure value based at least in part on a depression of the retroreflector;
   analyzing the pair of images further comprising computing a 3D depth contour for the retroreflector in a first pass and computing a 3D depth contour for the object in a second pass;
   computing the 3D depth contour for the retroreflector comprising extracting a 2D contour for each bright silhouette in each image in the pair and performing stereo matching between the 2D contours extracted from a first image in the pair and the 2D contours extracted from a second image in the pair; and removing distortion from each image in the image pair, rectifying each image in the image pair, and identifying parts of each image to not consider parts of the scene not contained in the other image in the image pair in the analysis.

10. A method according to claim 9, further comprising repeating the method to capture pairs of images at a predefined frame rate and wherein the analysis is performed on a frame by frame basis in real time.

11. The method according to claim 9, wherein computing a 3D depth contour for the object comprises:
for each image in the pair of images:
generating a convex hull of each extracted 2D contour in the image;
generating a modified image by inverting pixels within the image which are located within a convex hull; and
extracting a 2D contour for each bright silhouette in the modified image; and
performing stereo matching between the 2D contours extracted from a first modified image in the pair and the 2D contours extracted from a second modified image in the pair.

12. The method according to claim 9, wherein analyzing the pair of images further comprises:
classifying at least one of the retroreflector and the object by applying machine learning techniques to the 3D depth contour.

13. The method according to claim 12, further comprising:
generating an input signal for a software program based on a classification of at least the retroreflector.

14. The method according to claim 13, wherein the input signal is generated based on a classification of at least the retroreflector and a relative position of the retroreflector and the object.

15. The method according to claim 9, further comprising, prior to analyzing the pair of images:
removing distortion from each image in the image pair;
rectifying each image in the image pair; and
identifying parts of each image to not consider parts of the scene not contained in the other image in the image pair in the analysis.

16. The method according to claim 9 further comprising analyzing the pair of images further comprising classifying at least one of the retroreflector and the object by applying machine learning techniques to the 3D depth contour, generating an input signal for a software program based on a classification of at least the retroreflector and a relative position of the retroreflector and the object.

17. A 3D sensing system comprising:
a stereo camera;
a light source;
a 3D sensing module arranged to track both a retroreflector and an object partially occluding the retroreflector using image pairs captured by the stereo camera and to generate a closed 3D contour of each of the retroreflector and the object; and
the 3D sensing module further arranged to remove distortion from each image in an image pair, rectify each image in the image pair, and identify parts of each image to not consider parts of the scene not contained in the other image in the image pair in the analysis.

18. The system according to claim 17 further comprising a printed display content placard arranged to be removably placed on a back side of the retroreflector.

19. The system of claim 17 wherein the retroreflector is transparent at visible wavelengths of light and retroreflective at a wavelength range captured by the stereo camera.

20. The system of claim 17, wherein the retroreflector comprises a user interface layout formed on an upper surface of the retroreflector, wherein the user interface layout is transparent at a wavelength range over which the retroreflector retroreflects.

* * * * *